US008750674B2

(12) United States Patent
Cornell et al.

(10) Patent No.: US 8,750,674 B2
(45) Date of Patent: Jun. 10, 2014

(54) REMOTELY CONTROLLABLE DIGITAL VIDEO CAMERA SYSTEM

(75) Inventors: David James Cornell, Scottsville, NY (US); Kenneth Alan Parulski, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 329 days.

(21) Appl. No.: 13/244,983

(22) Filed: Sep. 26, 2011

(65) Prior Publication Data
US 2013/0077931 A1 Mar. 28, 2013

(51) Int. Cl.
H04N 5/77 (2006.01)

(52) U.S. Cl.
USPC .......................................... 386/224

(58) Field of Classification Search
None
See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 5,189,511 A | 2/1993 | Parulski et al. | |
| 5,652,621 A | 7/1997 | Adams, Jr. et al. | |
| 5,668,597 A | 9/1997 | Parulski et al. | |
| 5,729,289 A | 3/1998 | Etoh | |
| 6,192,162 B1 | 2/2001 | Hamilton, Jr. et al. | |
| 6,934,056 B2 | 8/2005 | Gindele et al. | |
| 6,978,085 B1 | 12/2005 | Maeda et al. | |
| 7,027,836 B2 | 4/2006 | Zacks et al. | |
| 7,542,077 B2 | 6/2009 | Miki | |
| 2004/0165077 A1 | 8/2004 | Ohmori | |
| 2004/0189850 A1 | 9/2004 | Chang | |
| 2006/0067672 A1 | 3/2006 | Washisu et al. | |
| 2007/0024931 A1 | 2/2007 | Compton et al. | |

OTHER PUBLICATIONS

Data sheet for Cisco WVC210 Wireless-G Pan Tilt Zoom (PTZ) Internet Video Camera, Jun. 2010.
International Search Report and Written Opinion for PCT/US2012/054976, mailed Apr. 11, 2013.
John M. Hoyt, IP Cam Viewer by Robert Chou is the best surveillance camera viewer for Android!, Oct. 11, 2010, 1 page, retrieved from the internet: http://www.homelandsecureit.com/blog/2010/10/ip-cam-viewer-by-robert-chou-is-the-best-surveillance-camera-viewer-for-android/, retrieved Dec. 6, 2012, 1 page.
SebMadgwickResearch: "Camera control/Stabilization with x-IMU", Mar. 14, 2011, 1 page. Retrieved from the Internet: http://www.youtube.com/watch?feature=iv&hl=en&v=xjZod2SWvz4&src_vid=7GVXqNLLH7Q&annotation_id=annotation-508385, 1 page.

Primary Examiner — William C Vaughn, Jr.
Assistant Examiner — Daniel Tekle

(57) ABSTRACT

A digital video camera system comprising image capture and recording units. The image capture unit includes an image sensor for capturing a digital video signal, an optical system for forming an image of a scene onto the image sensor, a controllable tilting mechanism for adjusting a pointing direction of the optical system, and a first wireless communication system. The image recording unit includes a second wireless communication system, an image display, a user interface including an orientation sensor, and a program memory storing instructions to implement a method for capturing a digital video sequence in response to user activation of a user control. The method includes wirelessly receiving a digital video signal from the image capture unit, displaying the received digital video signal on the image display, and adjusting the pointing direction of the optical system in response to detecting a change in the orientation of the image recording unit.

21 Claims, 9 Drawing Sheets

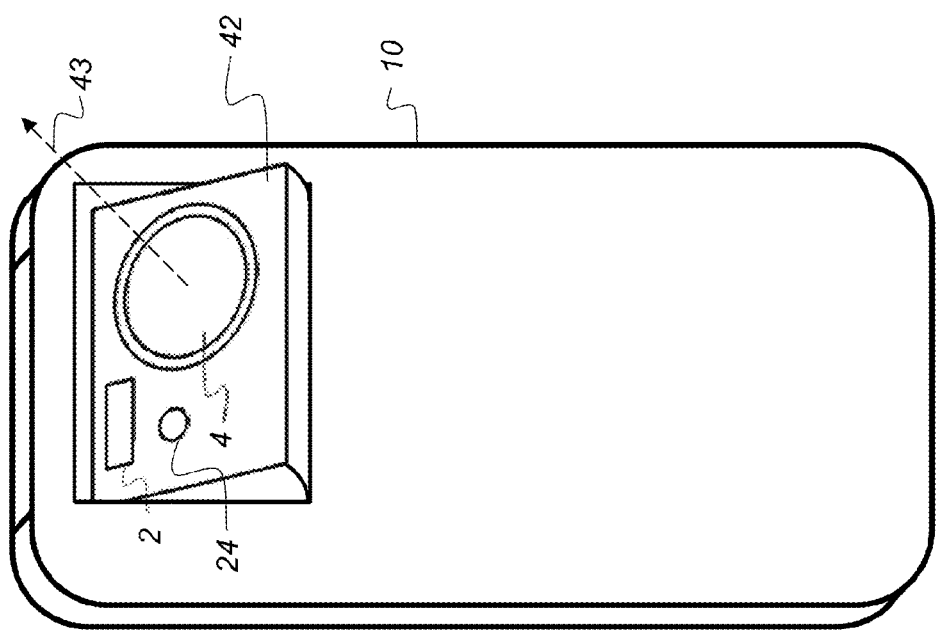

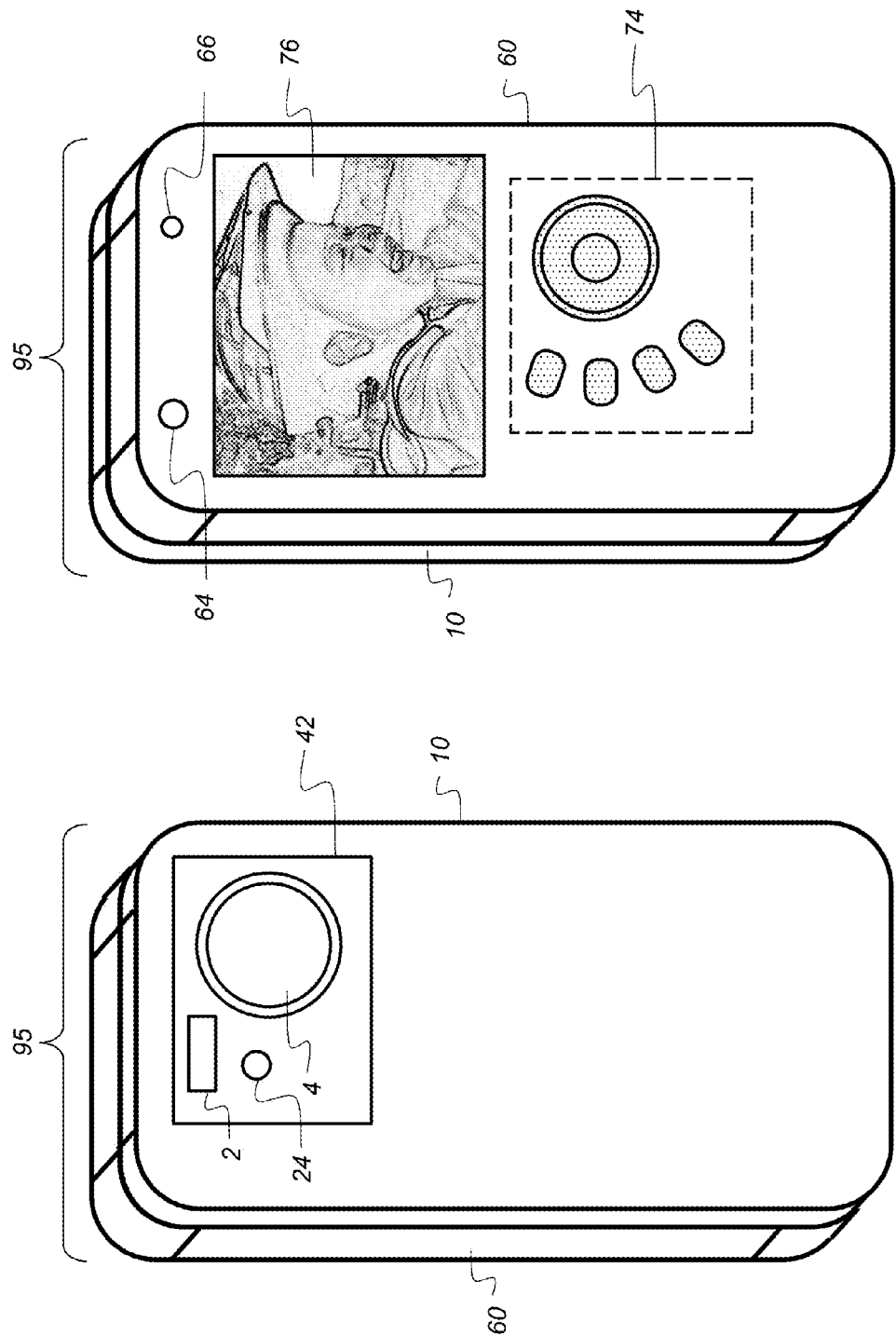

REMOTELY CONTROLLABLE DIGITAL VIDEO CAMERA SYSTEM

CROSS-REFERENCE TO RELATED APPLICATIONS

Reference is made to commonly assigned, co-pending U.S. patent application Ser. No. 13/244,977, entitled: "Digital video camera system having two microphones", by Cornell et al., which is incorporated herein by reference.

FIELD OF THE INVENTION

This invention pertains to the field of digital video systems, and more particularly to a digital video camera system having a wireless connection.

BACKGROUND OF THE INVENTION

Digital video cameras, such as the KODAK PLAYSPORT Zx5 Video Camera available from Eastman Kodak Company, Rochester, N.Y., capture, process, and store digital motion video images along with audio signals provided from a built-in microphone. The recorded digital video files can be transferred to other devices (e.g., by a network) for viewing, storage and editing. Typically, the user views the video images being recorded on the viewfinder display of the camera in order to compose the images as they are recorded. In some cases, the user may mount the camera on a tripod or other support, such as a bike handle or helmet, and use a remote control to control the camera. The user can edit the recorded video image files on a computer, for example by adding a "voice-over" audio to narrate previously captured video images.

Some video camera systems use separable modules to perform the video and audio capture and recording functions. For example, the Modular Video System 8-millimeter camcorder sold by Eastman Kodak company in 1986 included modular video camera and a recorder units that were docked together to provide a camcorder. Upon returning home, the recorder could be separated from the camera and mated to a tuner/timer module, in order to play back the recording as well as record television programs.

It is known to provide a digital video camera system that includes a wireless camera unit which communicates with a separate recording unit using wireless communications. For example, U.S. Pat. No. 6,978,085 to Maeda et al., entitled "Image pickup system with separable/attachable image pickup device and display device," describes a digital video camera that includes an image pickup device which captures, compresses, and transmits motion images over a wireless transmission channel to a display device which receives, decompresses, stores, and displays the transmitted image data.

It is also known to provide a digital camera having a detachable display module that can be used to control the camera from a remote position. This enables the user to be included in the captured image. For example, U.S. Patent Application 2004/0189850 to Chang, entitled "Digital camera with detachable display module," describes a digital camera which includes a wireless display module. The wireless display module includes control buttons which allow the user to remotely control the digital camera and to view the captured images.

U.S. Pat. No. 5,729,289 to Etoh, entitled "Image pick-up device and detachable display device each including means for controlling a predetermined function," discloses an electronic camera having an image pick-up unit and a detachable display device unit. When the detachable display device unit is mounted on the electronic camera, some of the camera user controls are no longer accessible, and these camera features are instead controlled using a touch screen menu displayed on the display device unit. However, the display device unit cannot be used to control the camera from a remote location, and cannot be used to record audio at the remote location.

U.S. Patent Application Publication 2004/0165077 to Ohmori, entitled "Digital camera having separable user module," discloses a digital camera having a user module that can be separated from a main body of the digital camera. The user module communicates with the digital camera using a wireless communication interface, and includes a display device, a user input device, a microphone, and a speaker. The user module transmits camera command signals to the main body of the digital camera, and receives digital images signals which are displayed on the display. The audio signals received from the microphone are transmitted to the main body of the digital camera and stored in the memory card using a voice file which is linked to an image file. Because the main body of the digital camera does not include a microphone, it is not possible to record audio signals in the vicinity of the main body, when the user module is separated from the main body. Moreover, because the recording function is provided by a memory card in the main body, the size of the main body cannot be fully miniaturized.

U.S. Pat. No. 7,027,836 to Zacks et al., entitled "Method and system for establishing a communication network," discloses a method for enabling communications between a plurality of wireless communication devices. The wireless communications devices include a contact surface which is used to establish communications, including peer-to-peer video transmission between devices that have been contacted. This enables video images captured by a first device to be displayed on the display of a second device. But it is not possible to use the second device in order to initiate capture of video images by the first device, or to record audio signals in the vicinity of the second device in temporal synchronization with the video images provided by the first device.

It is important for a digital video camera system to provide a high quality audio signal, in order to enable the user to produce compelling videos. This requires that the microphone used to capture the audio signals be positioned at an appropriate location, to record audio signals at appropriate times. This is especially important when the digital video system includes an image capture unit and an image recording unit that can be located at different positions, and pointed in different directions. Thus, there remains a need to provide a digital video camera system having separate capture and recording units that provides an improved way of recording audio and image signals.

SUMMARY OF THE INVENTION

The present invention represents a digital video camera system, comprising:
 an image capture unit having:
  an image sensor for capturing a digital video signal;
  an optical system for forming an image of a scene onto the image sensor;
  a controllable tilting mechanism for adjusting a pointing direction of the optical system;
  a first wireless communication system; and an image recording unit having:
a second wireless communication system for wirelessly communicating with the first wireless communication system;
an image display;
a user interface including one or more user controls, wherein the user controls include an orientation sensor that determines an orientation of the image recording unit;
a data processing system;
a storage memory for storing captured video images; and
a program memory communicatively connected to the data processing system and storing instructions configured to cause the data processing system to implement a method for capturing a digital video sequence, wherein the method includes:
detecting user activation of a user control to initiate the capture of the digital video sequence;
wirelessly receiving a digital video signal from the image capture unit;
displaying the received digital video signal on the image display;
detecting the orientation of the image recording unit using the orientation sensor;
wirelessly sending a signal to the image capture unit to control the controllable tilting mechanism thereby adjusting the pointing direction of the optical system in response to detecting a change in the orientation of the image recording unit;
storing the received digital video signal in a digital media file; and
detecting user activation of a user control to terminate the capture of the digital video sequence.

The present invention has the advantage that the capture of digital video signals at a first location can be controlled by a user from a second location It has the additional advantage that the pointing direction of the optical system in the image capture unit can be remotely controlled from the image recording unit. The pointing direction can be controlled using various user controls including an orientation sensor or a touch screen interface.

BRIEF DESCRIPTION OF THE DRAWINGS

FIG. 4C depicts a front view of the image capture unit from FIG. 4A where the pointing direction of the lens has been tilted;

FIG. 6A depicts a front view of the connected digital video camera unit in the first embodiment of the digital camera system;

FIG. 6B depicts a rear view of the connected digital video camera unit in the first embodiment of the digital camera system;

Figure 1A:
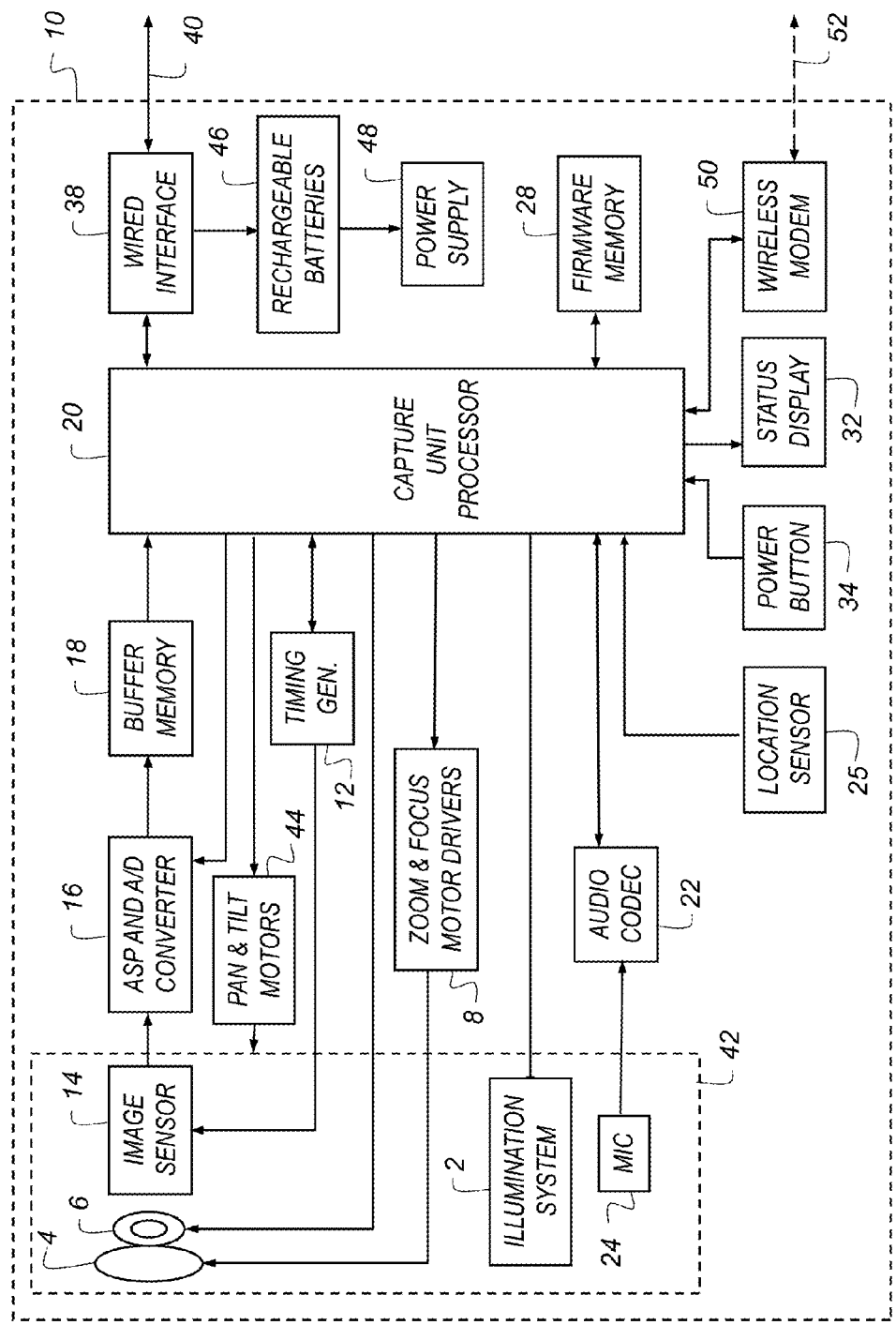
FIG. 1A is a high-level block diagram showing the components of an image capture unit for a digital camera system.

It is to be understood that the attached drawings are for purposes of illustrating the concepts of the invention and may not be to scale.

DETAILED DESCRIPTION OF THE INVENTION

In the following description, a preferred embodiment of the present invention will be described, parts of which would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory, tangible computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

Figure 4A:
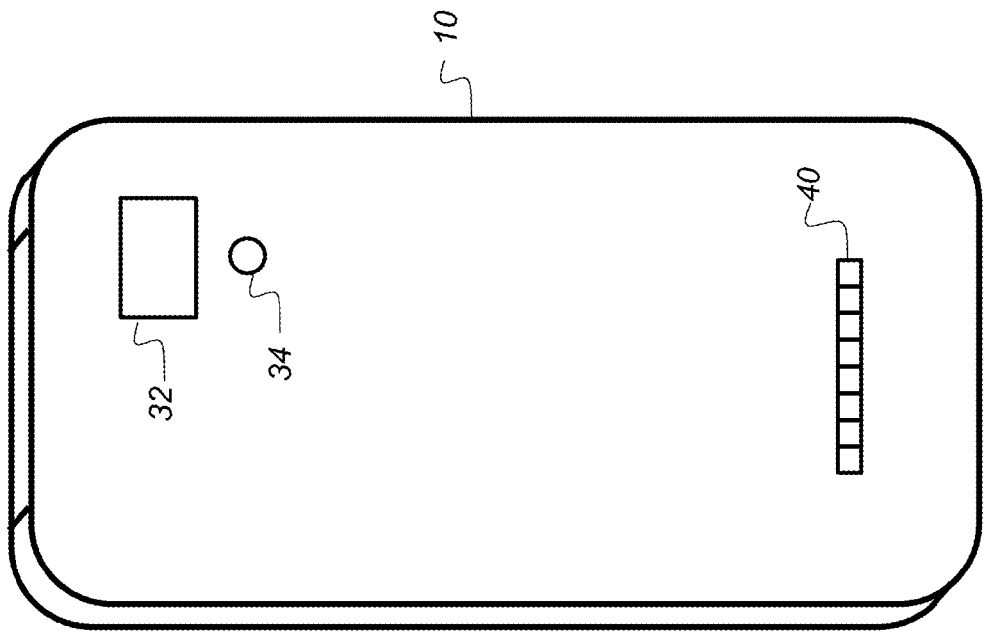
FIG. 4A depicts a front view of the image capture unit in a first embodiment of the digital camera system.
Figure 4B:
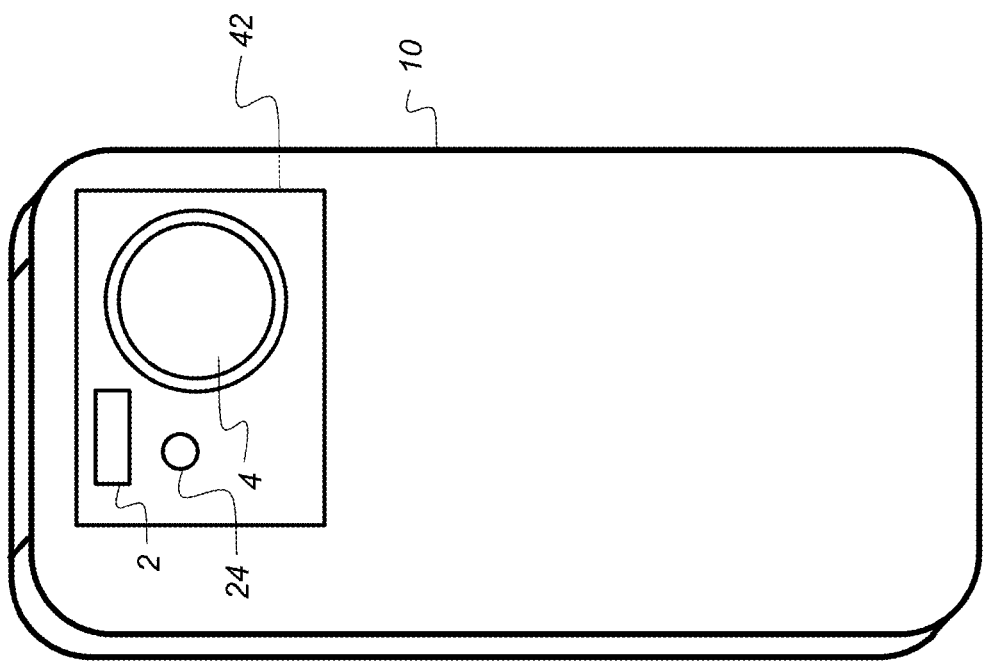
FIG. 4B depicts a rear view of the image capture unit in the first embodiment of the digital camera system.
Figures 5A, 5B:
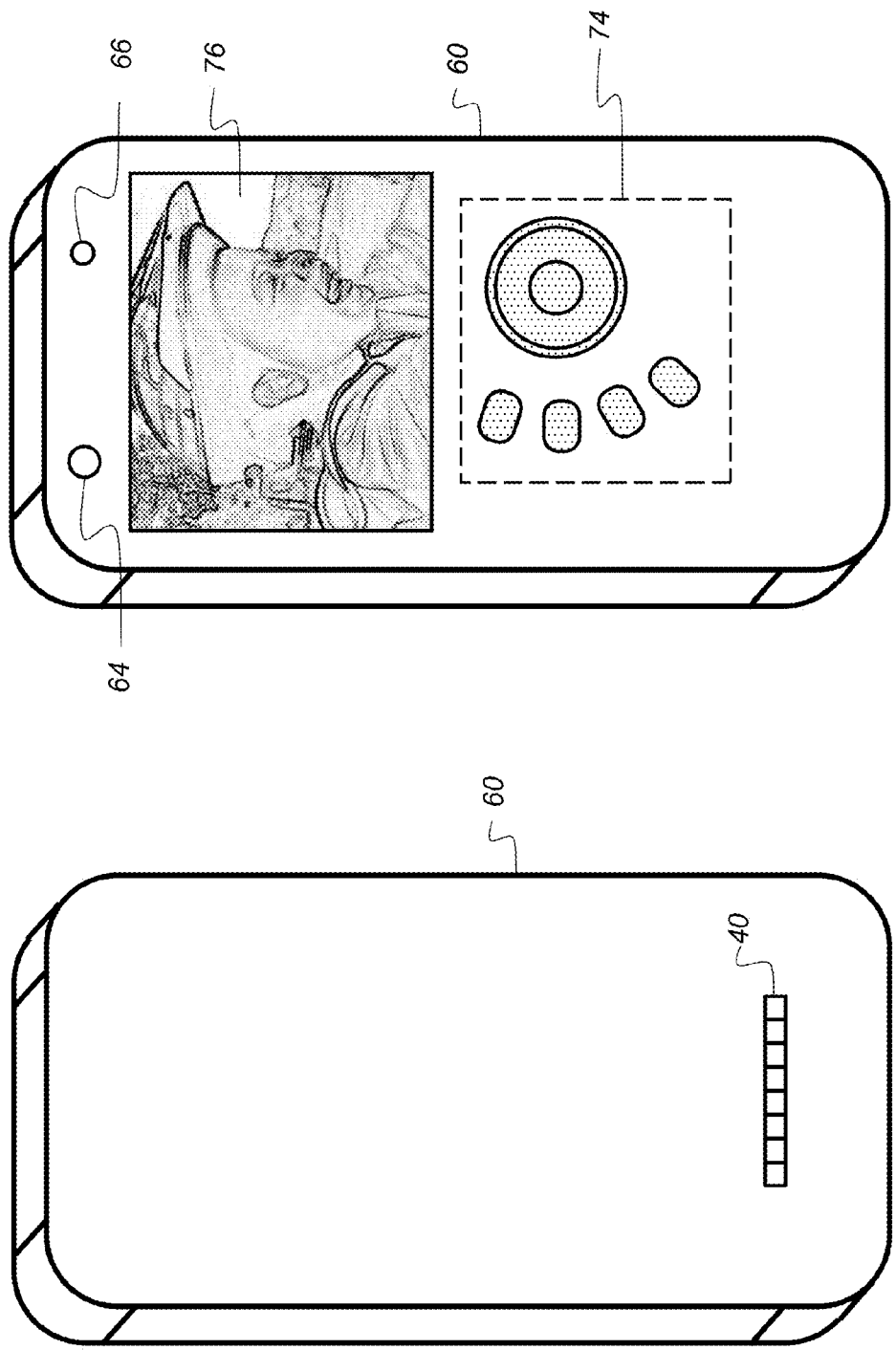
FIG. 5A depicts a front view of the image recording unit in the first embodiment of the digital camera system.
FIG. 5B depicts a rear view of the image recording unit in the first embodiment of the digital camera system.

FIG. 1A depicts a high-level block diagram showing the components of an image capture unit 10 for a digital camera system in accordance with the present invention. FIG. 4A depicts a front view of the image capture unit 10 and FIG. 4B depicts a rear view of the image capture unit 10, according to one embodiment. The image capture unit 10 can be mated with an image recording unit 60 shown in FIG. 1B using an interface connector 40. FIG. 5A depicts a front view of the image recording unit 60 and FIG. 5B depicts a rear view of the image recording unit 60, according to one embodiment.

In a preferred embodiment, the interface connector 40 connects the rear of the image capture unit 10 with the front of the image recording unit 60. In this case, the combination of the image capture unit 10 and the image recording unit 60 provide a one-piece connected digital video camera unit. FIG. 6A depicts a front view of the connected digital video camera unit 95 that results when the image capture unit of FIGS. 4A-4B and the image recording unit 60 of FIGS. 5A-5B are connected together. FIG. 6B depicts a rear view of the connected digital video camera unit 95. The image capture unit 10 can also be separated from the image recording unit 60. When separated, the image capture unit 10 communicates with the image recording unit 60 over a wireless interface 52.

Preferably, the image capture unit 10 shown in FIG. 1A is a portable, battery-operated device, small enough to be easily handheld by a user when capturing and reviewing video images. The image capture unit 10 produces digital image and audio data that is transferred to the image recording unit 60 shown in FIG. 1B using a wired interface 38 (via the interface connector 40) or using the wireless interface 52 (using a wireless modem 50). The image and audio data is stored in a digital video files using storage memory 84 in the image recording unit 60. The phrase "digital video file", as used herein, refers to any digital video file, such as an MEPG 2 video file, an MPEG 4 video file or an H.264 video file, which can include both image information and audio information.

In some embodiments, the image capture unit 10 captures still images as well as motion video images. The image capture unit 10 or the image recording unit 60 can also include other functions, including, but not limited to, the functions of a digital music player (e.g., an MP3 player), a mobile telephone, a GPS receiver, or a programmable digital assistant (PDA).

The image capture unit 10 includes a lens 4 having an adjustable aperture 6. The lens 4 focuses light from a scene (not shown) onto an image sensor 14, for example, a single-chip color CCD or CMOS image sensor. In a preferred embodiment, the lens 4 is a zoom lens and is controlled by zoom and focus motor drivers 8. This is only one example of an optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. It will be understood that if the image sensor 14 is a CMOS image sensor, the functions performed by the Analog Signal Processor (ASP) and Analog-to-Digital (A/D) converter 16 can be provided by the circuitry in the CMOS image sensor.

The image data stored in buffer memory 18 is subsequently manipulated by a capture unit processor 20, using embedded software programs (e.g. firmware) stored in firmware memory 28. In some embodiments, the software programs are permanently stored in firmware memory 28 using a read only memory (ROM). In other embodiments, the software programs stored in the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which should be preserved when the camera is turned off. In some embodiments, the capture unit processor 20 includes a program memory (not shown), and the software programs stored in the firmware memory 28 are copied into the program memory before being executed by the capture unit processor 20.

The image sensor 14 is controlled by a timing generator 12, which produces various clocking signals to select rows and pixels and synchronizes the operation of the ASP and A/D converter 16. It will be understood that if the image sensor 14 is a CMOS image sensor, the functions performed by the timing generator 12 can be provided by circuitry in the CMOS image sensor.

The image sensor 14 can have, for example, 5.3 megapixels with a 16:9 image aspect ratio, in order to provide high resolution still images as well as high definition motion video images. To provide a color image, the pixels of the image sensor 14 are typically overlaid with a color filter array, which provides an image sensor having an array of pixels that include different color pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity," the disclosure of which is incorporated herein by reference. These examples are not limiting, and many other color patterns may be used.

As mentioned earlier, it will be understood that in some embodiments, the image sensor 14, timing generator 12, and ASP and A/D converter 16 can be fabricated as a single integrated circuit as is commonly done with CMOS image sensors. In some embodiments, this single integrated circuit can also perform some of the other functions shown in FIG. 1A, including some of the functions provided by capture unit processor 20.

The zoom and focus motor drivers 8 are controlled by control signals supplied by the capture unit processor 20, to provide the appropriate focal length setting and to focus the scene onto the image sensor 14. The exposure level provided to the image sensor 14 is controlled by controlling the adjustable aperture 6 and by controlling the exposure period of the image sensor 14 via the timing generator 12, and a gain (i.e., ISO speed) setting for the ASP and A/D converter 16. The capture unit processor 20 also controls an illumination system 2 which can illuminate the scene. In some embodiments, the illumination system 2 can be an electronic flash. In other embodiments, the illumination system 2 can use other types of light sources, such as LEDs, that can be operated in a continuous fashion.

The lens 4 of the image capture unit 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the capture unit processor 20 determines the closest focus position which provides a peak sharpness value for a central portion of the image captured by the image sensor 14. The focus distance that corresponds to the closest focus position can then be utilized for several purposes, such as automatically setting an appropriate scene mode, and can be stored as metadata in the image file, along with other lens and camera settings.

An audio codec 22 connected to the capture unit processor 20 receives an audio signal from a microphone 24. These components can be used to create an audio signal at the location of the image capture unit 10.

In some embodiments, the lens 4, image sensor 14, illumination system 2 and microphone 24 are mounted to a movable stage 42 which are controlled by pan and tilt motors 44. This permits the pointing direction of the lens 4, the illumination system and the microphone 24 to be controlled using user interface controls in the image recording unit 60. In some embodiments, only the lens 4 is controlled by pan and tilt motors 44, and the illumination system 2 and microphone 24 remain in a fixed position. In some embodiments, the movable stage 42 may include an orientation sensor (not shown) for sensing the pointing direction of the movable stage 42.

In some embodiments, the user interface controls in the image recording unit 60 can include one or more buttons enabling the user to control the pointing direction. In other embodiments, the image display 76 on the image recording unit 60 is a touch screen. In such cases, appropriate touch screen user controls can be used to control the pointing direction in response to detecting predefined touch patterns. For example, virtual buttons can be provided that are activated by the user touching the virtual buttons. Alternately, the user can drag a finger around on the touch screen to make corresponding movements in the pointing direction (e.g., if the finger is dragged to the left, the pointing direction can be panned to the left).

In other embodiments, the image recording unit 60 contains an orientation sensor (not shown) for sensing an orientation of the image recording unit 60. Orientation sensors are well-known in the art and generally use components such as accelerometers, gyroscopes and electronic compasses to sense an orientation. In this case, the pointing direction of the movable stage 42 can be controlled by tilting or shaking the image recording unit 60. For example, if an orientation sensor detects that the user has tilted the image recording unit 60 in an "up" direction, the pan and tilt motors 44 in the image capture unit 10 can redirect the movable stage 42 (and therefore the lens 4) to point in a more "upwards" direction. For example, FIG. 4C shows the image recording unit 10 of FIG. 4A, wherein the movable stage 42 has been adjusted so that the pointing direction 43 of the lens 4 has been tilted upwards.

In some embodiments, more than one mechanism can be provided for controlling the pointing direction of the movable stage 42. For example, the pointing direction can be controlled using an orientation sensor in the image recording unit 60, and by using real or virtual buttons provided as part of the user interface for the image recording unit 60. In some implementations, the user can choose the preferred user controls for controlling the pointing direction that should be active using a user preference setting. In other embodiments, all of the different user controls can be active simultaneously and the user can choose which one(s) are most convenient to use in a particular situation.

In some embodiments, a location sensor 25, such as a global position system (GPS) sensor, is included in the image capture unit 10, in order to provide geographical location information concerning the position of the image capture unit 10 when video or still images are captured. GPS sensors are well-known in the art and operate by sensing signals emitted from GPS satellites. A GPS sensor receives highly accurate time signals transmitted from GPS satellites. The precise geographical location of the GPS sensor can be determined by analyzing time differences between the signals received from a plurality of GPS satellites positioned at known locations.

A power button 34 and status display 32 are preferably located on the rear of the image capture unit 10, as shown in FIG. 4B. The power button 34 enables the user of the image capture unit 10 to turn on and off the image capture unit 10 when it is separated from the image recording unit 60. The status display 32 can indicate various pieces of information that are useful to a user, such as whether the power is turned on, and whether wireless communication has been established with the image recording unit 60. When the rear of the image capture unit 10 is mated to the front of the image recording unit 60, the power button 34 and the status display are hidden, and are not used.

The capture unit processor 20 controls the operation of the image capture unit 10, and provides the digital video signals from the buffer memory 18 to the wired interface 38 (when the image capture unit 10 is mated with the image recording unit 60) and to the wireless modem 50 (when the image capture unit 10 is separated from the image recording unit 60). In some embodiments, the capture unit processor 20 provides additional processing of the image data from the image sensor 14, in order to produce rendered image data (in a color space such as the well-known sRGB color space), which is compressed and transmitted to the image recording unit 60, as will be described later in reference to FIG. 2.

The image capture unit 10 includes wireless modem 50, which communicates with the image recording unit 60 over the wireless interface 52. The wireless modem 50 can use various wireless interface protocols, such as the well-known Bluetooth wireless interface or the well-known 802.11 wireless interface.

The image capture unit 10 also includes wired interface 38, which can conform to, for example, the well-known USB 2.0 interface specification. When the image capture unit 10 is connected via the wired interface 38 to the image recording unit 60, and the image recording unit 60 is connected to the interface/recharger 96 (see FIG. 1B), the interface/recharger 96 can provide power via the wired interface 38 to a set of rechargeable batteries 46 in the image capture unit 10. The rechargeable batteries 46 can supply power to a power supply 48, which powers the various components of the image capture unit 10.

Figure 1B:
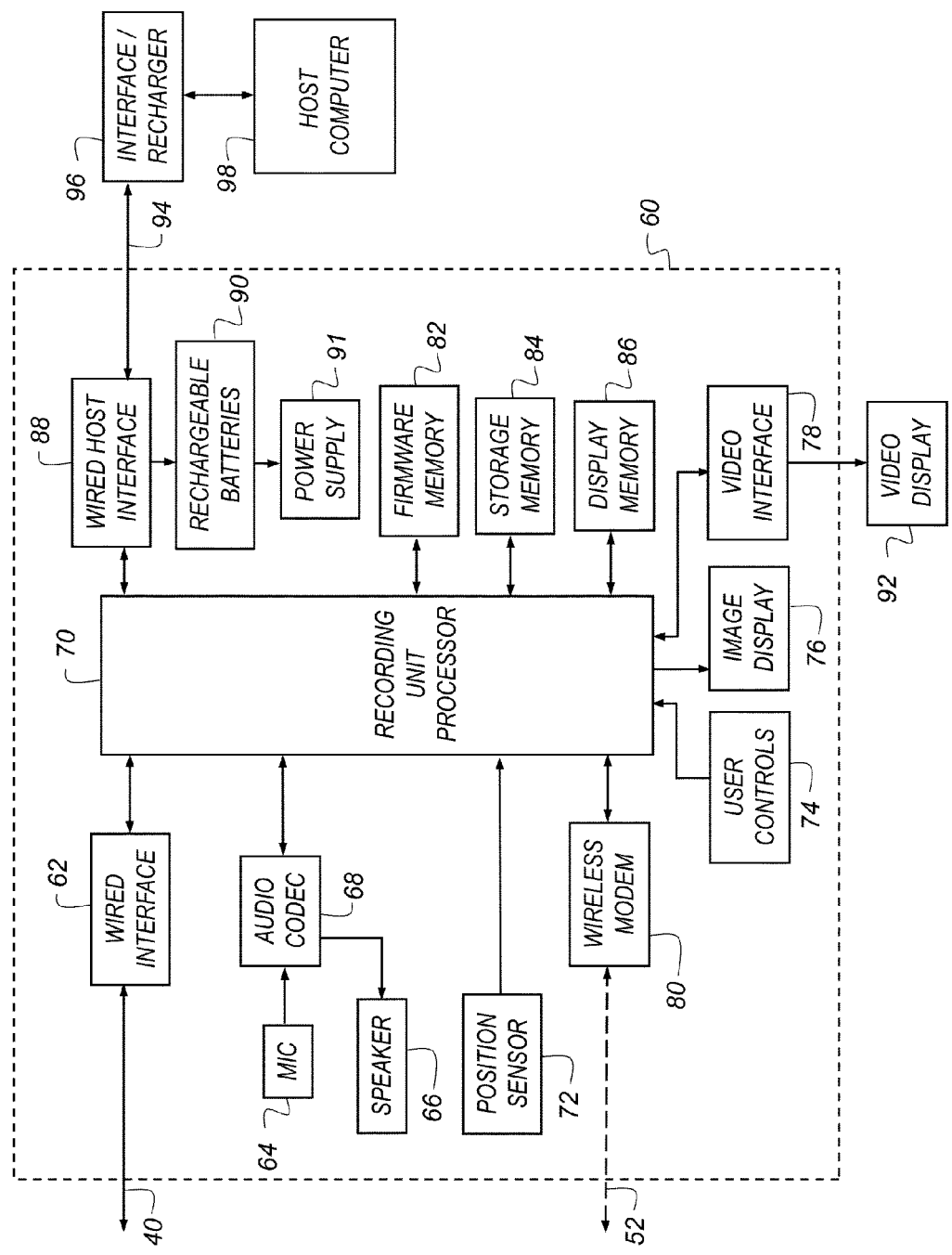
FIG. 1B is a high-level block diagram showing the components of an image recording unit for a digital camera system.

FIG. 1B is a high-level block diagram showing the components of the image recording unit 60 of the digital camera system. When the image recording unit 60 is mated with the image capture unit 10, recording unit processor 70 uses a wired interface 62 to control the image capture unit 10, and to obtain digital image and digital audio signals from the image capture unit 10.

When the image recording unit 60 is connected to the interface/recharger 96, the interface/recharger 96 can provide power via the wired interface 94 to a set of rechargeable batteries 90. The rechargeable batteries 90 can supply power to a power supply 91, which powers the various components of the image recording unit 60. In some embodiments, when the image recording unit 60 is connected to the image capture unit 10, the wired interface 62 also provides power to recharge the rechargeable batteries 46 in the image capture unit 10.

When the image recording unit 60 is separated from the image capture unit 10, the recording unit processor 70 uses a wireless modem 80 to control the image capture unit 10, and to obtain digital image and digital audio signals from the image capture unit 10.

An audio codec 68 connected to the recording unit processor 70 receives an audio signal from a microphone 64. These components can be used to create an audio signal at the location of the image recording unit 60. A speaker 66 is used to play back recorded audio signals. If the image recording unit 60 is a multi-function device, such as a combination camera and mobile phone, the microphone 64 and the speaker 66 can also be used for other functions, such as telephone conversations.

The image and audio data provided from the image capture unit 10 can be processed by the recording unit processor 70, using embedded software programs (e.g., firmware) stored in firmware memory 82. For example, if the capture unit processor 20 compresses the audio and motion image signals before they are received by the wireless modem 80, then the recording unit processor 70 can decompress the received compressed data, in order to provide motion images for display on image display 76. In parallel, the compressed data can be stored in storage memory 84

The processed still images and digital video sequences are stored using the storage memory 84. It is understood that the storage memory 84 can be any form of memory known to those skilled in the art including, but not limited to, a removable Flash memory card, internal Flash memory chips, magnetic memory, or optical memory. In some embodiments, the storage memory 84 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

In some embodiments, the software programs used by the recording unit processor 70 are permanently stored in firmware memory 82 using a read only memory (ROM). In other embodiments, the software programs stored in the firmware memory 82 can be modified by using, for example, Flash EPROM memory. In such embodiments, an external device can update the software programs stored in firmware memory 82 using wired host interface 88 or the storage memory 84 (e.g., if the storage memory 84 is provided using a removable memory card). In some embodiments, the recording unit processor 70 includes a program memory (not shown), and the software programs stored in the firmware memory 82 are copied into the program memory before being executed by the recording unit processor 70.

The recording unit processor 70 produces menus and low resolution color images that are temporarily stored in display memory 86 and are displayed on the image display 76. The image display 76 is typically an active matrix color liquid crystal display (LCD), although other types of displays, such as organic light emitting diode (OLED) displays, can be used. A video interface 78 provides a video output signal from the image recording unit 60 to an external video display 92, such as a flat panel HDTV display. In video capture mode, the digital image data from buffer memory 18 (FIG. 1A) is manipulated by capture unit processor 20 and the recording unit processor 70 to form a series of motion images that are displayed, typically as color images, on the image display 76. In video playback mode, the images displayed on the image display 76 are produced using the image data from the digital video files stored in storage memory 84.

In a preferred embodiment, a graphical user interface displayed on the image display 76 is controlled in response to user input provided by user controls 74. The user controls 74 are used to select various camera modes (such as video capture mode, still capture mode, and review mode), to initiate capture of still images, and to initiate and terminate the recording of digital video sequences. The user controls 74 are also used to set various user preferences, such as to specify whether audio signals from the microphone 24 in the image capture unit 10, or audio signals from microphone 64 in image recording unit 60, should be recorded as part of the digital video sequence.

The user controls 74 are also used to turn on and off the image recording unit 60, and also to turn on and off the image capture unit 10 when the image capture unit 10 is mated with the image recording unit 60. The user controls 74 are also used to control the zoom setting of the lens 4 (via the zoom and focus motor drivers 8), and to control the pointing direction of the lens 4 (via the pan and tilt motors 44).

User controls 74 typically include some combination of buttons, rocker switches, joysticks, or rotary dials. In some embodiments, some of the user controls 74 are provided by using a touch screen overlay on the image display 76. In other embodiments, the user controls 74 can include a means to receive input from the user or an external device via a tethered, wireless, voice activated, visual or other interface. In other embodiments, additional status indicators (e.g., status lights), status displays or image displays can be used besides the image display 76.

In some embodiments, the speaker 66 can be used as part of the user interface, for example to provide various audible signals (e.g., beeps) which indicate that a user control has been depressed, or that a particular mode has been selected. In some embodiments, the microphone 64, the audio codec 68, and the recording unit processor 70 can be used to provide voice recognition, so that the user can provide a user input to the recording unit processor 70 by using voice commands, rather than user controls 74.

A host computer 98 can be used to upload digital media files, including digital still images and digital video clips to Internet websites, such as Flickr, YouTube, and the Kodak EasyShare Gallery.

It will be understood that the functions of capture unit processor 20 or the recording unit processor 70 can be provided using a single programmable processor or by using multiple programmable processors, including one or more digital signal processor (DSP) devices. Alternatively, the capture unit processor 20 or the recording unit processor 70 can be provided by custom circuitry (e.g., by one or more custom integrated circuits (ICs) designed specifically for use in digital cameras), or by a combination of programmable processor(s) and custom circuits. It will be understood that, in some embodiments, connections between the capture unit processor 20 or the recording unit processor 70 from some or all of the various components shown in FIG. 1A or FIG. 1B can be made using a common data bus. For example, in some embodiments the connection between the capture unit processor 20, the buffer memory 18, the storage memory 30, and the firmware memory 28 can be made using a common data bus.

Figure 2:
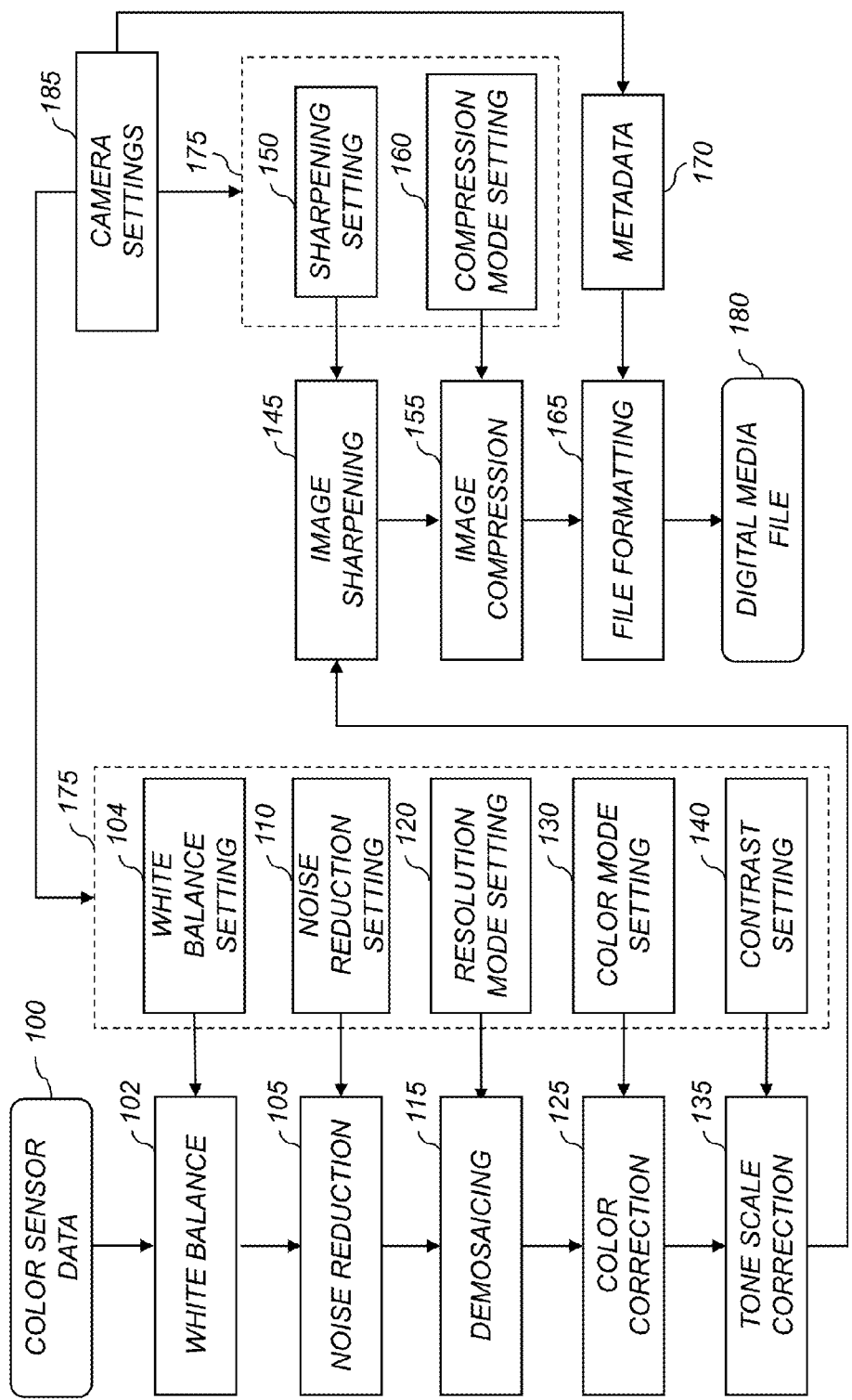
FIG. 2 is a flow diagram depicting image processing operations used to process digital images captured by the digital camera system of FIGS. 1A-1B.

FIG. 2 is a flow diagram depicting image processing operations that can be performed by the capture unit processor 20 in the image capture unit 10 (FIG. 1A) or by the recording unit processor 70 in the image recording unit 60 (FIG. 1B) in order to process color sensor data 100 from the image sensor 14 output by the ASP and A/D converter 16 (FIG. 1A). In some embodiments, various processing parameters used to manipulate the color sensor data 100 for a particular digital image are determined by user settings 175, which are typically associated with photography modes that can be selected via the user controls 74 (FIG. 1B), which enable the user to adjust various camera settings 185 in response to menus displayed on the image display 76 (FIG. 1B).

The color sensor data 100, which has been digitally converted by the ASP and A/D converter 16 (FIG. 1A), is manipulated by a white balance step 102. In some embodiments, this processing can be performed using the methods described in commonly-assigned U.S. Pat. No. 7,542,077 to Miki, entitled "White balance adjustment device and color identification device", the disclosure of which is herein incorporated by reference. In some embodiments, the white balance can be adjusted in response to a white balance setting 104, which can be manually set by the user.

The color image data is then manipulated by a noise reduction step 105 in order to reduce noise from the image sensor 14 (FIG. 1A). In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to a noise reduction setting 110. The noise reduction setting 110 is generally tied to the camera ISO exposure index setting, so that more noise filtering is performed at higher ISO exposure index settings.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, in order to produce various resolution digital video sequences. For example, the user may be permitted to select between resolution mode settings 120 corresponding to video image sequences having resolutions of 1920×1080 pixels, 1280×720 pixels or 848×480 pixels. The process implemented by demosaicing step 115 will generally be a function of the resolution mode setting 120.

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, one of a plurality of tone scale correction look-up tables is selected by the user. These can include look-up tables which provide a "normal" tone scale correction curve, a "high contrast" tone scale correction curve, and a "low contrast" tone scale correction curve. A user selected contrast setting 140 is used to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, one of three different edge boost multiplier values, for example 2.0 for "high sharpness", 1.0 for "normal sharpness", and 0.5 for "low sharpness" levels, responsive to a sharpening setting 150 can be selected by the user.

The color image data is also manipulated by an image compression step 155. In some embodiments, the image compression step 155 can be provided using motion video compression algorithms, such as the well-known H.264 compression. In some embodiments, the user can select between various compression settings 160, corresponding to different image quality levels.

The compressed color image data is stored, along with compressed audio information, in a digital media file 180, such as an H.264 file, using a file formatting step 165. The digital media file 180 can include various metadata 170. Metadata 170 is any type of information that relates to the digital image, such as the model of the camera that captured the image, the resolution of the motion or still image, the date and time the image was captured, and various camera settings 185, such as the camera mode, the lens focal length, the exposure time and F/# of the lens, or the orientation or GPS location of the image capture unit 10. In some embodiments, this metadata 170 is stored using standardized tags within the digital media file 180.

Figure 3:
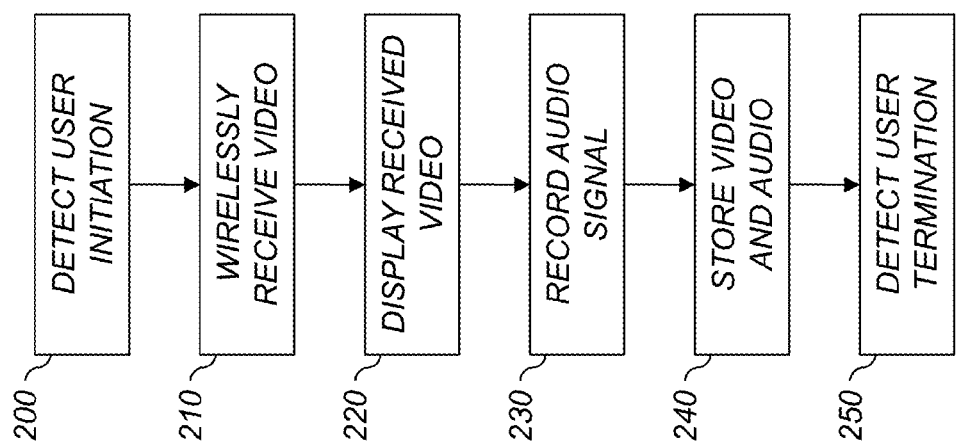
FIG. 3 is a flowchart of a method for capturing a digital video sequence

FIG. 3 is a flowchart of a method for capturing a digital video sequence according to the present invention. In detect user initiation step 200, the activation of a user interface control to initiate the capture of the digital video sequence is detected. In some embodiments, the recording unit processor 70 in the image recording unit 60 (FIG. 1B) detects the user activation of one of the user controls 74. In response, the image recording unit 60 communicates over the wireless interface 52 with the capture unit processor 20 in the image capture unit 10 (FIG. 1A), in order to instruct the capture unit processor 20 to begin capturing digital video images using the image sensor 14, and to begin transmitting a digital video signal to the image recording unit 60. In some embodiments, the user controls 74 of the image recording unit 60 are also used to provide one or more of the user settings 175 described earlier in relation to FIG. 2, such as the resolution mode setting 120. This enables the image recording unit 60 to control the characteristics of the video signal transmitted from the image capture unit 10.

In wirelessly receive video step 210, the image recording unit 60 (FIG. 1B) wirelessly receives a digital video signal from the image capture unit 10 (FIG. 1A). In some embodiments, the image recording unit 60 receives a compressed video signal, which is decompressed by the recording unit processor 70, in order to permit motion images captured by the image capture unit 10 to be displayed on the image display 76. In other embodiments, the image recording unit 60 receives an uncompressed video signal, which is then compressed by the recording unit processor 70 before being stored in the storage memory 84.

In display received video step 220, the received digital video signal is displayed on the image display 76 of the image recording unit 60. This permits the user to determine when to start and stop the recording of the video sequence. If the image sensor 14 has significantly higher resolution than the image display 76, the recording unit processor 70 is used to resize the received digital video signal in order to provide motion digital images having suitable pixel resolution to match the image display 76.

In record audio signal step 230, an audio signal derived from a first audio signal provided by the microphone 24 in the image capture unit 10 and a second audio signal provided by the microphone 64 in the image recording unit 60 is recorded in temporal synchronization with the received digital video signal. This enables the recording of audio information both in the vicinity of the image capture unite 10 and in the vicinity of the image recording unit 60. In some embodiments, both the first and second audio signals are recorded separately. In other embodiments, the first and second audio signals are combined to form a combined audio signal that is recorded. A user control can optionally be provided to enable the user to adjust the relative sound recording levels. In some embodiments, a user control can be provided to permit the user to select one of the audio signals from microphones 24 and 64 as the audio signal to be recorded.

In store video and audio step 240, the received digital video signal and the recorded audio signal are stored, using at least one digital media file, in the storage memory 84. It will be understood that during the recording process, the user can remotely control the digital video signal provided by the image capture unit 10. In some embodiments, this can be provided in response to zoom or pan buttons provided as part of the user controls 74. In some other embodiments, the user can tilt or shake the image recording unit 60 in order to change the pointing direction of the lens 4 in the image capture unit 10.

In detect user termination step 250, the activation of a user interface control to terminate the capture of the digital video sequence is detected. In some embodiments, the recording unit processor 70 in the image recording unit 60 detects the user activation of one of the user controls 74.

Figure 7:
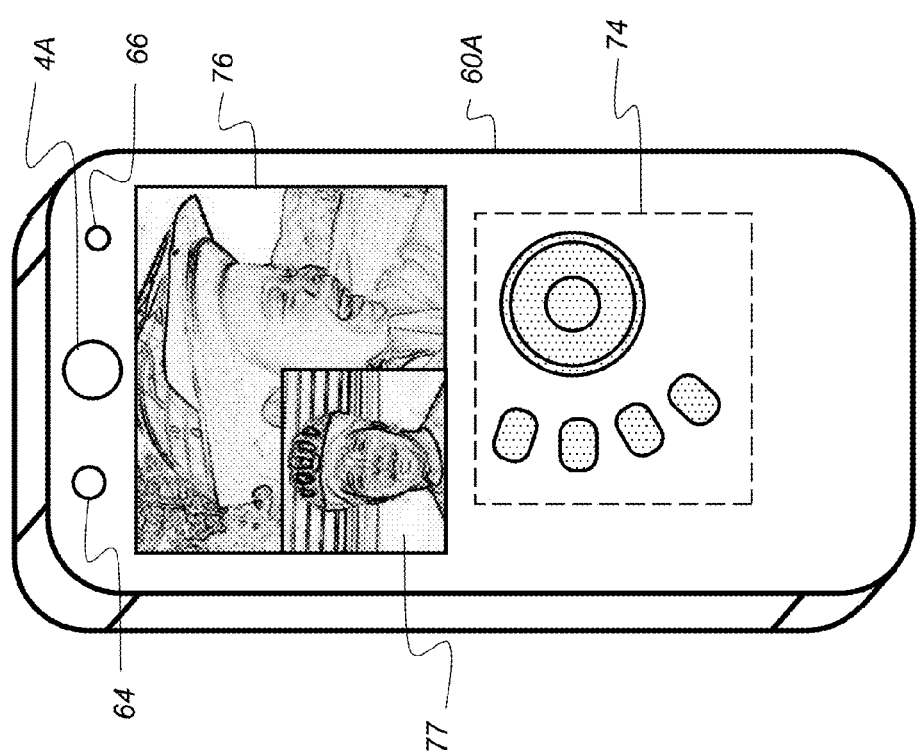
FIG. 7 depicts a rear view of the image recording unit in a second embodiment of the digital camera system.

FIG. 7 depicts a rear view of an image recording unit 60A in a second embodiment of the digital camera system. In this embodiment, the image recording unit 60A includes a lens 4A which forms an image on a second image sensor (not shown), in order to capture images of the user of the image recording unit 60A. The image display 76 shows the image captured using the second image sensor as a "picture-in-picture" window 77. The digital video signal provided by the second image sensor can be recorded either in the same digital media file used to record the digital video signal received from the image capture unit 10, or can be recorded using a separate digital media file. In another variation of this second embodiment, a secondary illumination system can also be included on the rear side of the image recording unit 60A (e.g., an electronic flash or LED light sources) to provide rearward illumination. The image display 76 can also be used to provide illumination to the scene on the rear side of the image recording unit 60A (e.g., by displaying a white image on the image display 76).

The invention has been described in detail with particular reference to certain preferred embodiments thereof, but it will be understood that variations and modifications can be effected within the spirit and scope of the invention.

| PARTS LIST | |
|---|---|
| 2 | illumination system |
| 4 | lens |
| 4A | lens |
| 6 | adjustable aperture |
| 8 | zoom and focus motor drivers |
| 10 | image capture unit |
| 12 | timing generator |
| 14 | image sensor |
| 16 | ASP and A/D Converter |
| 18 | buffer memory |
| 20 | capture unit processor |
| 22 | audio codec |
| 24 | microphone |

-continued

PARTS LIST

| | |
|---|---|
| 25 | location sensor |
| 28 | firmware memory |
| 32 | status display |
| 34 | power button |
| 38 | wired interface |
| 40 | interface connector |
| 42 | moveable stage |
| 43 | pointing direction |
| 44 | pan and tilt motors |
| 46 | rechargeable batteries |
| 48 | power supply |
| 50 | wireless modem |
| 52 | wireless interface |
| 60 | image recording unit |
| 60A | image recording unit |
| 62 | wired interface |
| 64 | microphone |
| 66 | speaker |
| 68 | audio codec |
| 70 | recording unit processor |
| 74 | user controls |
| 76 | image display |
| 77 | picture-in-picture window |
| 78 | video interface |
| 80 | wireless modem |
| 82 | firmware memory |
| 84 | storage memory |
| 86 | display memory |
| 88 | wired host interface |
| 90 | rechargeable batteries |
| 91 | power supply |
| 92 | video display |
| 94 | wired interface |
| 95 | connected digital video camera unit |
| 96 | interface/recharger |
| 98 | host computer |
| 100 | color sensor data |
| 102 | white balance step |
| 104 | white balance setting |
| 105 | noise reduction step |
| 110 | noise reduction setting |
| 115 | demosaicing step |
| 120 | resolution mode setting |
| 125 | color correction step |
| 130 | color mode setting |
| 135 | tone scale correction step |
| 140 | contrast setting |
| 145 | image sharpening step |
| 150 | sharpening setting |
| 155 | image compression step |
| 160 | compression setting |
| 165 | file formatting step |
| 170 | metadata |
| 175 | user settings |
| 180 | digital media file |
| 185 | camera settings |
| 200 | detect user initiation step |
| 210 | wirelessly receive video step |
| 220 | display received video step |
| 230 | record audio signal step |
| 240 | store video and audio step |
| 250 | detect user termination step |

The invention claimed is:

1. A digital video capture system, comprising:
an image capture unit comprising:
an image sensor configured to capture a digital video signal;
an optical system configured to form an image of a scene onto the image sensor;
a controllable tilting mechanism configured to adjust a pointing direction of the optical system; and
a first wireless communication system; and
an image recording unit comprising:
a second wireless communication system configured to wirelessly communicate with the first wireless communication system;
an image display;
a user interface including one or more user controls, wherein the user controls include an orientation sensor configured to determine an orientation of the image recording unit;
a data processing system;
a storage memory configured to store captured video images; and
a program memory communicatively connected to the data processing system and storing instructions configured to cause the data processing system to implement a method for capturing a digital video sequence, wherein the method includes:
wirelessly receiving a digital video signal from the image capture unit;
displaying the received digital video signal on the image display;
detecting the orientation of the image recording unit using the orientation sensor;
wirelessly sending a signal to the image capture unit to control the controllable tilting mechanism thereby adjusting the pointing direction of the optical system in response to detecting a change in the orientation of the image recording unit; and
storing the received digital video signal in a digital media file.

2. The digital video capture system of claim 1, wherein the pointing direction of the optical system is adjusted in a direction corresponding to a direction of the detected change in the orientation of the image recording unit.

3. The digital video capture system of claim 1, wherein the one or more user controls include one or more buttons that can be activated to adjust the pointing direction of the optical system.

4. The digital video capture system of claim 1, wherein the image display is a touch screen, and wherein the pointing direction of the optical system is adjusted in response to detecting a predefined touch pattern.

5. The digital video capture system of claim 4, wherein virtual buttons are provided on the image display, and wherein the pointing direction of the optical system is adjusted in response to detecting that the user has touched the virtual buttons.

6. The digital video capture system of claim 4, wherein the pointing direction of the optical system is adjusted in response to detecting movement of a user finger that is in contact with the touch screen, the pointing direction of the optical system being adjusted in a direction corresponding to a direction of the detected movement.

7. The digital video capture system of claim 1, wherein the image capture unit and the image recording unit include interface connectors to enable the image recording unit to be the physically connected to the image capture unit.

8. The digital video capture system of claim 1, wherein when the image capture unit is connected to the image recording unit they can be operated as a one-piece connected digital video camera unit.

9. The digital video capture system of claim 8, wherein the image capture unit further includes a rechargeable battery for powering the image capture unit, and wherein the rechargeable battery is recharged through the interface connector when the image capture unit is connected to the image recording unit.

10. The digital video capture system of claim 9, wherein the rechargeable battery in the image capture unit is recharged when the image recording unit is connected to an external recharger.

11. The digital video capture system of claim 1, wherein the image capture unit further includes an image capture unit microphone, and wherein an audio signal is stored in temporal synchronization with the received digital video signal, the audio signal being derived from an image capture unit audio signal captured by the image capture unit microphone.

12. The digital video capture system of claim 11, wherein a pointing direction of the image capture unit microphone is controlled together with the pointing direction of the optical system.

13. The digital video capture system of claim 1, wherein the image capture unit further includes an image capture unit microphone and the image recording unit further includes an image recording unit microphone, and wherein at least one audio signal is stored in temporal synchronization with the received digital video signal, the at least one audio signal being derived from an image capture unit audio signal captured by the image capture unit microphone and an image recording unit audio signal captured by the image recording unit microphone.

14. The digital video capture system of claim 13, wherein a user control is provided to enable the user to select one or both of the image capture unit audio signal and the image recording unit audio signal to be stored in the at least one digital media file.

15. The digital video capture system of claim 13, wherein the image capture unit audio signal and the image recording unit audio signal are combined to form a combined audio signal which is stored in the at least one digital media file.

16. The digital video capture system of claim 15, wherein a user control is provided to enable a user to control relative sound recording levels for the image capture unit audio signal and the image recording unit audio signal in the combined audio signal.

17. The digital video capture system of claim 1, wherein the at least one digital media file is a single digital media file.

18. The digital video capture system of claim 1, wherein the image recording unit further includes:

a second image sensor for capturing a second digital video signal; and a second optical system for forming an image of a second scene onto the second image sensor.

19. The digital video capture system of claim 18, wherein the second digital video signal is recorded in the at least one digital media file.

20. A method comprising: capturing a digital video signal using an image sensor of an image recording unit; forming an image of a scene onto the image sensor; wirelessly receiving a digital video signal from the image recording unit, wherein the wirelessly receiving comprises wireless communications between a first wireless communication system and a second wireless communication system: displaying the received digital video signal on an image display; detecting an orientation of the image recording unit using an orientation sensor; wirelessly sending a signal to the image recording unit to control a controllable tilting mechanism of the image recording unit thereby adjusting a pointing direction of the optical system in response to detecting a change in the orientation of the image recording unit; and storing the received digital video signal in a digital media file.

21. A non-transitory computer readable medium having instructions stored thereon, the instructions comprising: instructions for capturing a digital video signal using an image sensor of an image recording unit; instructions for forming an image of a scene onto the image sensor; instructions for wirelessly receiving a digital video signal from the image recording unit; wherein the wirelessly receiving comprises wireless communications between a first wireless communication system and a second wireless communication system; instructions for displaying the received digital video signal on an image display; detecting an orientation of the image recording unit using an orientation sensor; instructions for wirelessly sending a signal to the image recording unit to control a controllable tilting mechanism of the image recording unit thereby adjusting a pointing direction of the optical system in response to detecting a change in the orientation of the image recording unit; and instructions for storing the received digital video signal in a digital media file.

* * * * *